United States Patent
Hwang et al.

(10) Patent No.: US 10,950,902 B2
(45) Date of Patent: Mar. 16, 2021

(54) BATTERY MANAGEMENT SYSTEM AND BATTERY CELL ARRAY

(71) Applicant: Myeong-Eun Hwang, San Jose, CA (US)

(72) Inventors: Myeong-Eun Hwang, San Jose, CA (US); Insuh Hwang, Seongnam-Si (KR)

(73) Assignee: Myeong-Eun Hwang, San Jose, CA (US)

( * ) Notice: Subject to any disclaimer, the term of this patent is extended or adjusted under 35 U.S.C. 154(b) by 250 days.

(21) Appl. No.: 15/874,902

(22) Filed: Jan. 19, 2018

(65) Prior Publication Data

US 2019/0229381 A1    Jul. 25, 2019

(51) Int. Cl.
| | | |
|---|---|---|
| *H01M 10/00* | (2006.01) | |
| *H01M 10/48* | (2006.01) | |
| *H01M 10/46* | (2006.01) | |
| *H01M 2/10* | (2006.01) | |

(52) U.S. Cl.
CPC ....... *H01M 10/482* (2013.01); *H01M 2/1022* (2013.01); *H01M 2/1077* (2013.01); *H01M 10/46* (2013.01); *H01M 2220/20* (2013.01); *H01M 2220/30* (2013.01)

(58) Field of Classification Search
CPC ......... H01M 10/4207; H01M 2220/20; H01M 2/1022; H01M 2010/4271
See application file for complete search history.

(56) References Cited

U.S. PATENT DOCUMENTS

2016/0261127 A1* 9/2016 Worry ................ H01M 10/425

FOREIGN PATENT DOCUMENTS

| KR | 10-2003-0081932 A | 10/2003 |
|---|---|---|
| KR | 10-2016-0135646 A | 11/2016 |
| KR | 10-2017-0110885 A | 10/2017 |

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

A battery management system includes several blocks: a battery cell array comprising a plurality of battery cells; a charger selector array connected electrically to the battery cell array to charge the battery cells; an analyzer array configured to monitor a condition or status of the battery cells and report the condition or status of the battery cells; a battery output array connected electrically to the battery cell array to provide electric power out of the battery cells; and a controller configured to control charge movement and command flow among the blocks in the battery system such as charger selector array and the battery output array according to the reported condition or status from the analyzer array.

11 Claims, 5 Drawing Sheets

BATTERY MANAGEMENT SYSTEM AND BATTERY CELL ARRAY

BACKGROUND

Field of the Invention

One or more embodiments of the present invention relate to battery management system and battery cell array.

Description of Related Art

When a battery is charged and discharged once, it is called a charge cycle. Battery capacity degrades as the number of charge cycles increases. Battery life is measured in charge cycles, with an industry standard of cycles to 80% capacity often used as a benchmark. There are four major factors that shorten the battery life: high temperature; overcharging or high voltage; deep discharging or low voltage; and high discharge or charge current.

For example, Lithium battery voltage must not exceed preset battery threshold levels such as the maximum charge voltage; failure to do so may shorten battery life or permanently damage the battery itself. In some batteries, a battery management system (BMS) is used to control charging voltage so that the maximum charge voltage and/or temperature are never exceeded.

High voltage can also lead to another limit, called the calendar life. As a battery ages, the layer where the exchange of ions happens increases and internal resistance increases. At some point, the layer becomes large enough that no ions can pass and the battery life ends. This kind of battery lifetime limit is worsened the longer the cell is kept at maximum voltage and high temperature. The idea here is to avoid maximum voltage and high temperature for extended periods of time.

To increase cell calendar life, overvoltage and high temperature must be avoided. In addition, at the other end of cell voltage and charge, for maximum cycle life, deep discharge must be avoided as well. Experimental data suggest an inverse power-law dependence of the cycle life on the DoD, such that a four-fold lifetime gain is achieved going from 100% to 50% DoD, where the DoD (depth of discharge) means a degree of being discharged. For maximum battery cycle life, 100% DoD must be avoided. Another description is called the state of charge (SoC). If a cell is fully charged, it is said to be at 100% SoC. The SoC works like a fuel gauge.

Not all Battery Cells are Created Equal

A battery system usually consists of multiple battery cells. In general, not all batter cells are produced identical and each battery cell can vary greatly in its native endurance capability having a finite lifespan. A battery cell further degrades in voltage and charge-storing capability as the cell repeats being charged-and-discharged due to deterioration in the chemical, physical, mechanical and electrical properties of the materials, and the slow erosion of the insulators as a result of repeated charging and discharging processes to and from the battery cell, respectively. Over time, the cell degrades and its ability to hold electrical charge diminishes.

A finite lifetime dictated by the number of repeated charging-and-discharging processes is termed as the charge cycle that a battery cell can endure. As mentioned above, the term is typically used to specify a battery's expected life, as the number of charge cycles affecting life more than the mere passage of time. The act of discharging the battery fully before recharging may be called "deep discharge"; partially discharging then recharging may be called "shallow discharge".

Charged and Discharged and Obsolete Battery Cells

There are several states of battery cells in the present invention such as charged, discharged and obsolete cells. Charged cells are charged up to a certain high threshold voltage level that is less than or equal to its maximum chargeable voltage level in a certain period of time. Discharged cells are discharged down to a low threshold voltage level that is more than or equal to its minimum prohibitive level or completed discharged level. Obsolete cells are battery cells that cannot be charged up to a certain voltage level within a certain period of time or degrade and lose their capability to hold electric charge due to aging or damages.

SUMMARY

One or more embodiments of the present invention include a battery management system to avoid a premature wear-out of a heavily used battery cell(s).

Additional aspects will be set forth in part in the description which follows and, in part, will be apparent from the description, or may be learned by practice of the presented embodiments.

According to an embodiment of the present invention, a battery management system includes: a battery cell array including a plurality of battery cells; a charger selector array connected electrically to the battery cell array to charge the battery cells; an analyzer array configured to monitor a condition or status of the battery cells and reports a condition or status of each battery cell; a battery output array connected electrically to the battery cell array to provide a voltage of battery cells as a whole or in part; and a controller configured to control operation of the charger selector array and/or the battery output array according to the reported condition or status from the analyzer array, and configured to selectively activate a select signal(s) to choose a battery cell(s) in a battery array.

The condition or status may include the amount or degree of being charged and discharged, a number of times of being charged and discharged, whether working properly or not, whether being able to be charged up to a certain voltage level within a certain time, a maximum chargeable voltage, and a charging voltage level for each battery cell.

The condition or status may include information of whether a certain battery cell has a fault that the battery cell is not rechargeable enough up to a certain pre-defined voltage level within a certain time.

The controller is configured to tune the battery cell array to meet a specific endurance levels required for a variety of applications by reconfiguring the battery cell array, and/or the charger selector array and/or the battery output array accordingly.

The controller is configured to newly redirect the charging and discharging processes to a different battery cell(s) to avoid a premature wear-out of a too heavily used battery cell(s).

The controller is configured to exclude an obsolete cell in selection as a normal cell for valid battery operation and replace the obsolete cell with a candidate cell selected from a pool of redundant cells by reconfiguring the battery cell array, and/or the charger selector array and/or the battery output array accordingly.

The controller is configured to allow the battery cell array to be reconfigured, and/or the charger selector array and/or the battery output array to enable a spare or redundant battery cell(s) to be electrically and/or mechanically connected to a given battery cell network in serials and/or parallel, wherein a battery cell(s) from the active pool is already connected in serials and/or parallel, to achieve quick increase in voltage or power at the battery outputs in BOOST battery mode.

The controller is configured to allow the battery cell array to be reconfigured, and/or the charger selector array and/or the battery output array to work with fewer active cells by electrically and/or mechanically disconnecting an active cell(s) from a given battery cell network, wherein battery cells from the active pool are already connected in serials and/or parallel, to achieve quick decrease in voltage or power at the battery outputs in LESSENING battery mode.

The controller is configured to allow the battery cell array to be reconfigured, and/or the charger selector array and/or the battery output array to work with fewer active cells or a different battery cell(s) available from other pools such as the charged pool or redundant pool by electrically and/or mechanically disconnecting an overheated active cell(s) and/or replacing an overheated active cell(s) with a less-heated candidate cell(s) from other pools in a given battery cell network to achieve quick decrease in temperature based on the temperature information reported from a temperature sensor(s) placed on a battery cell(s) and/or the battery system in thermal THROTTLING battery mode.

The battery cell may be traced and/or selected in a queue or pool, and a data structure for the queue or pool can be stored in either off-device or on-device.

The battery cell in a battery array of battery cells may be classified into one of pools such as an active pool, a discharged pool and a charged pool, wherein the active pool consists of battery cells electrically charged and selected to provide electric power to the battery output terminals, the discharged pool consists of battery cells deeply or shallowly discharged and requiring to be recharged to be active, wherein the charged pool consists of battery cells charged enough and ready to be active. When a battery cell is or gets faulty, the cell becomes an obsolete one excluded from the active, charged, and discharged pools mentioned above and/or maybe belonged to another pool like an obsolete pool further, if necessary.

According to an embodiment of the present invention, a battery cell array includes: a plurality of battery banks, each battery bank including a two-dimensional m-by-n or higher-order matrix of battery cells; a row address decoder configured to activate selected address lines such as a wordline(s); a column address decoder configured to activate selected address lines such as a bitline(s); an address decoder(s), if required, configured to activate a select signal(s) to select another additional address line(s) for a more than two-dimensional matrix of battery cells; and a controller configured to activate a bank select signal(s) to select a battery bank(s) of the plurality of battery banks.

The m is a number of rows and the n is a number of columns.

The controller is configured to newly redirect the charging and discharging processes to a different battery cell(s) to avoid a premature wear-out of a heavily used battery cell(s).

The controller is configured to exclude an obsolete cell in selection as a normal cell for valid battery operation and replace the obsolete cell with a candidate cell selected from a pool of redundant cells by reconfiguring the matrix of battery cells, and/or the charger selector array and/or the battery output array accordingly.

The controller is configured to allow the battery cell array to be reconfigured, and/or the charger selector array and/or the battery output array to enable a spare or redundant battery cell(s) to be electrically and/or mechanically connected to a given battery cell network in serials and/or parallel, wherein a battery cell(s) from the active pool is already connected in serials and/or parallel, to achieve quick increase in voltage or power at the battery outputs in BOOST battery mode.

The controller is configured to allow the battery cell array to be reconfigured, and/or the charger selector array and/or the battery output array to work with fewer active cells by electrically and/or mechanically disconnecting an active cell(s) from a given battery cell network, wherein battery cells from the active pool are already connected in serials and/or parallel, to achieve quick decrease in voltage or power at the battery outputs in LESSENING battery mode.

The controller is configured to allow the battery cell array to be reconfigured, and/or the charger selector array and/or the battery output array to work with fewer active cells or a different battery cell(s) available from other pools such as the charged pool or redundant pool by electrically and/or mechanically disconnecting an overheated active cell(s) and/or replacing an overheated active cell(s) with a less-heated candidate cell(s) from other pools in a given battery cell network to achieve quick decrease in temperature based on the temperature information reported from a temperature sensor(s) placed on a battery cell(s) and/or the battery system in thermal THROTTLING battery mode.

The battery cell in the two-dimensional m-by-n or higher-order matrix of battery cells may be traced or selected through a queue or pool, and a data structure for the queue or pool may be stored in either off-device or on-device.

The battery cell in the two-dimensional m-by-n or higher-order matrix of battery cells may be classified into one of pools such as an active pool, a discharged pool and a charged pool, wherein the active pool consists of battery cells electrically charged and selected to provide electric power to the battery output terminals, the discharged pool consists of battery cells deeply or shallowly discharged and requiring to be recharged to be active, wherein the charged pool consists of battery cells charged enough and ready to be active. When a battery cell is or gets faulty, the cell becomes an obsolete one excluded from the active, charged, and discharged pools mentioned above and/or maybe belonged to another pool like an obsolete pool further, if necessary.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a battery device according to an exemplary embodiment of the present invention will be described with reference to the accompanying drawings.

Battery Cell and Pack

Batteries achieve the desired operating voltage by connecting several cells in series; each cell adds its voltage potential to derive at the final terminal voltage. Parallel connection attains higher capacity by adding up the total ampere-hour (Ah).

Some battery packs may consist of a combination of series and/or parallel connections. For example, laptop batteries commonly have four 3.6V Li-ion cells in series to achieve a nominal voltage 14.4V and two in parallel to boost the capacity from 2,400 mAh to 4,800 mAh. Such configuration called 4s2p means that there are four battery cells in series and two in parallel. Insulating foil between the cells prevents the conductive metallic skin from causing an electrical short.

Most battery chemistries lend themselves to series and parallel connection. It is important to use the homogeneous battery type with equal voltage and capacity (Ah) and never to mix different makes and sizes. A weaker cell would cause an imbalance and reduce the life span and use time of a battery device.

Figure 1:
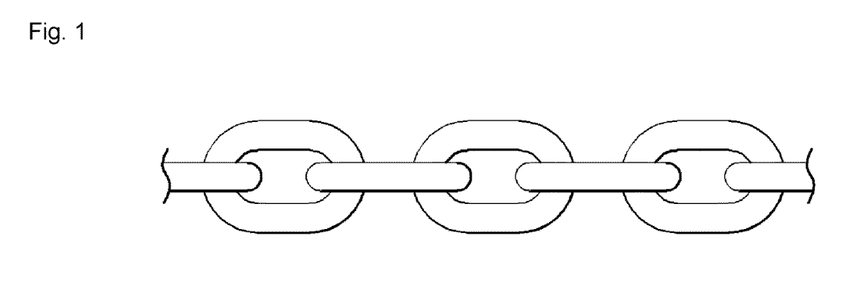
FIG. 1 shows an analogy of battery cell connectivity with a chain in which the links represent the cells of a battery connected in series.

FIG. 1 shows an analogy of battery cell connectivity with a chain in which the links represent the cells of a battery connected in series.

This is especially critical in a series configuration because a battery is only as strong as the weakest link in the chain.

A weak cell may not fail immediately but will get exhausted more quickly than the strong ones when in continued use. On charge, the low cell fills up before the strong ones because there is less to fill and it remains over-charged longer than the others. On discharge, the weak cell empties first and gets hammered by the stronger neighbors. Cells in multi-packs must be matched, especially when used under heavy loads.

The chain links represent cells in series to increase voltage and doubling a link denotes parallel connection to boost current loading.

Series or Serial Connection

Portable equipment needing higher voltages use battery packs with two or more cells connected in series.

Figure 2:
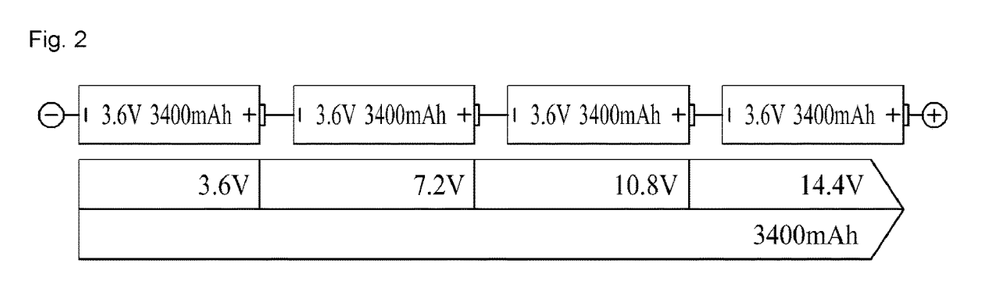
FIG. 2 shows a serial or series connection of four cells.

FIG. 2 shows a series or serial connection of four cells.

Referring to FIG. 2, a battery pack with four 3.6V Li-ion cells in series is represented, known as 4s, to produce 14.4V nominal. In comparison, a six-cell lead acid string with 2V/cell will generate 12V, and four alkaline with 1.5V/cell will give 6V.

Adding cells in a string increases the voltage and keeps the capacity same. Cordless power tools run on 12V and 18V batteries and high-end models use 24V and 36V. Most e-bikes come with 36V Li-ion, some are 48V. The car industry wanted to increase the starter battery from 12V (14V) to 36V, better known as 42V, by placing 18 lead acid cells in series. Logistics of changing the electrical components and arcing problems on mechanical switches derailed the move. Some mild hybrid cars run on 48V Li-ion and use DC-DC conversion to 12V for their electrical systems. Starting the engine is often done by a separate 12V lead acid battery. On the other hand, early hybrid cars ran on a 148V battery and electric vehicles are typically 450-500V. Such batteries need more than 100 Li-ion cells connected in series. The Teslar 85 further devours over 7,000 18650 cells to make up to the 90 KWh pack.

High-voltage batteries require careful cell matching, especially when drawing heavy loads or when operating at cold temperatures. With multiple cells connected in a string, the possibility of one cell failing is real and this would cause a failure. To prevent this from happening, a solid state switch in some large packs bypasses the failing cell to allow continued current flow, albeit at a lower string voltage.

Cell matching is a challenge when replacing a faulty cell in an aging pack. A new cell has a higher capacity than the others, causing an imbalance. Welded construction adds to the complexity of the repair, and this is why battery packs are commonly replaced as a unit.

High-voltage batteries in electric vehicles, in which a full replacement would be prohibitive, divide the pack into modules, each consisting of a specific number of cells. If one cell fails, only the affected module is replaced. A slight imbalance might occur if the new module is fitted with new cells.

Figure 3:
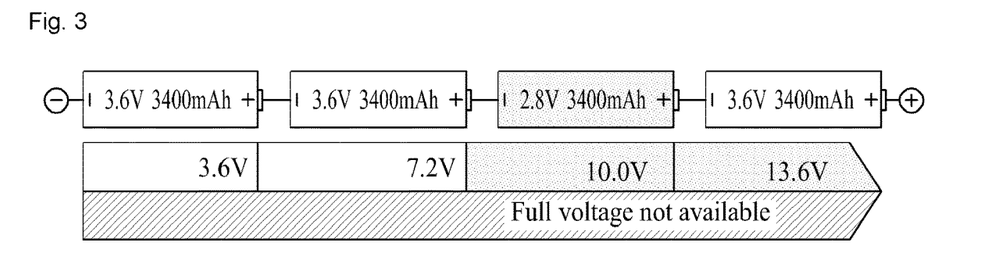
FIG. 3 shows a serial connection with one faulty cell.

FIG. 3 shows a serial connection with one faulty cell.

FIG. 3 describes a battery pack in which "cell 3" produces only 2.8V instead of the full nominal 3.6V. With depressed operating voltage, this battery reaches the end-of-discharge point sooner than a normal pack. The voltage then collapses and the device turns off with a "Low Battery" message.

Faulty cell lowers the total voltage and cuts the equipment off prematurely.

Batteries in drones and remote controls for a hobbyist requiring high load current often exhibit an unexpected voltage drop if one cell in a string becomes weak. Drawing maximum current stresses frail cells, leading to a possible crash. Reading the voltage after a charge does not identify this anomaly; examining the cell-balance or checking the capacity with a battery analyzer will do.

Parallel Connection

Figure 4:
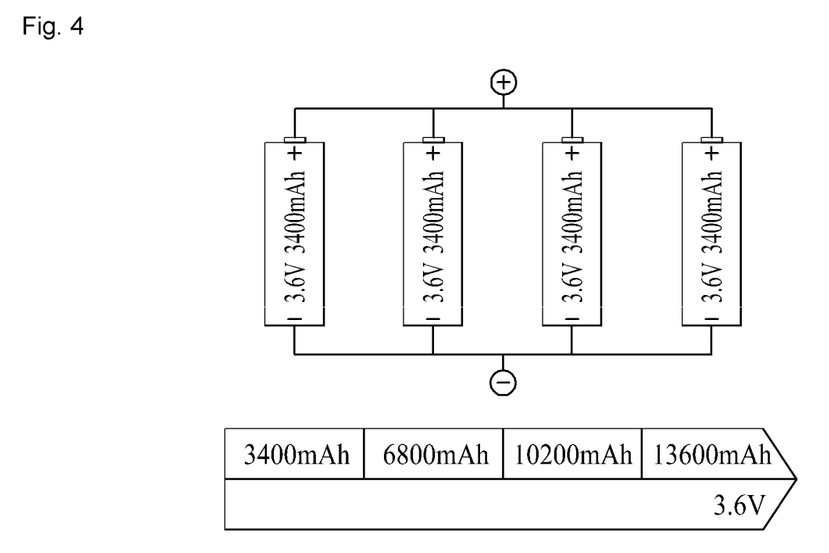
FIG. 4 shows a parallel connection of four cells.

FIG. 4 shows a parallel connection with one faulty cell.

If higher currents are needed and larger cells are not available or do not fit the design constraint, one or more cells can be connected in parallel. Most battery chemistries allow parallel configurations with little side effect. FIG. 4 illustrates four cells connected in parallel in a 4p arrangement. The nominal voltage of the illustrated pack remains at 3.60V, but the capacity (Ah) and runtime are increased fourfold.

A cell that develops high resistance or opens is less critical in a parallel circuit than in a series configuration, but a failing cell will reduce the total load capability. It's like an engine only firing on three cylinders instead of on all four. An electrical short, on the other hand, is more serious as the faulty cell drains energy from the other cells, possibly causing a fire hazard. Most so-called electrical shorts are mild and manifest themselves as elevated self-discharge.

Figure 5:
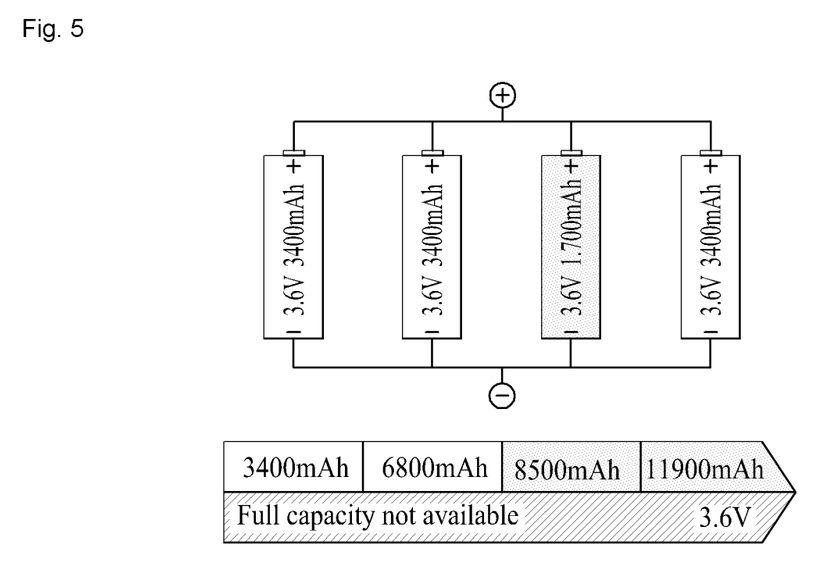
FIG. 5 shows a parallel connection with one faulty cell.

FIG. 5 shows a parallel connection with one faulty cell.

An electrical short can occur through reverse polarization or dendrite growth. Large packs often include a fuse that disconnects the failing cell from the parallel circuit if it were to short.

A weak cell will not affect the voltage but provide a low runtime due to reduced capacity. A shorted cell could cause excessive heat and become a fire hazard. On larger packs a fuse prevents high current flow by isolating the faulty cell.

Series/Parallel Connection

Figure 6:
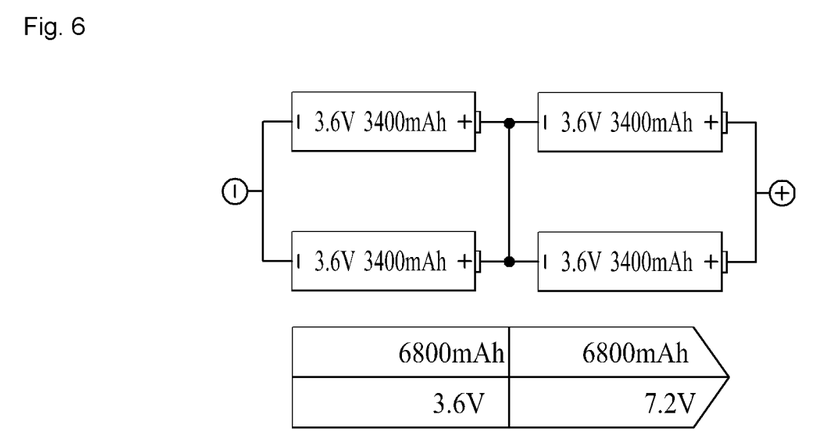
FIG. 6 shows a serial and parallel connection of four cells.

The series and parallel configuration shown in FIG. 6 enables design flexibility and achieves the desired voltage and current ratings with a given 18650 standard cell unit (3.6V 3400 mAh in this example). The total power is the product of voltage-times-current; four 3.6V (nominal) cells multiplied by 3,400 mAh produce 12.24 Wh. Four energy cells of 3,400 mAh each can be connected in series and parallel as shown to get 7.2V nominal and 12.24 Wh. The slim cell allows flexible pack design but a protection circuit is needed.

Li-ion lends itself well to series/parallel configurations but the cells need monitoring to stay within voltage and current limits. Integrated circuits for various cell combinations are available to supervise up to 13 Li-ion cells. Larger packs need custom circuits, and this applies to e-bike batteries, hybrid cars and the Tesla Model 85 that devours over 7,000 18650 cells to make up the 90 kWh pack.

FIG. 6 shows a serial and parallel connection of four cells.

The configuration provides maximum design flexibility. Paralleling the cells helps in voltage management.

Safety Devices in Series and Parallel Connection

Mechanical temperature sensors such as thermometers, electrical temperature sensors such as Positive Temperature Coefficient (PTC) and Negative Temperature Coefficient (NTC) thermistors, and Charge Interrupt Devices (CIDs) protect the battery from overcurrent and excessive pressure. While recommended for safety in a smaller 2- or 3-cell pack with serial and parallel configuration, these protection devices are often being omitted in larger multi-cell batteries, such as those for power tools. The NTC, PTC and CID work as expected to switch off the cell on excessive current and internal cell pressure; shutdown however occurs in a cascade way. While some cells may go offline early, the load current causes excess current on the remaining cells. Such overload condition could lead to a thermal runaway before the remaining safety devices activate.

Some cells may have built-in NTC and/or PTC and/or CID; these protection devices can also be added retroactively. Note that any safety device is subject to failure. In addition, the PTC induces a small internal resistance that reduces the load current.

1. Array Structure of Battery Management System

Figure 7:
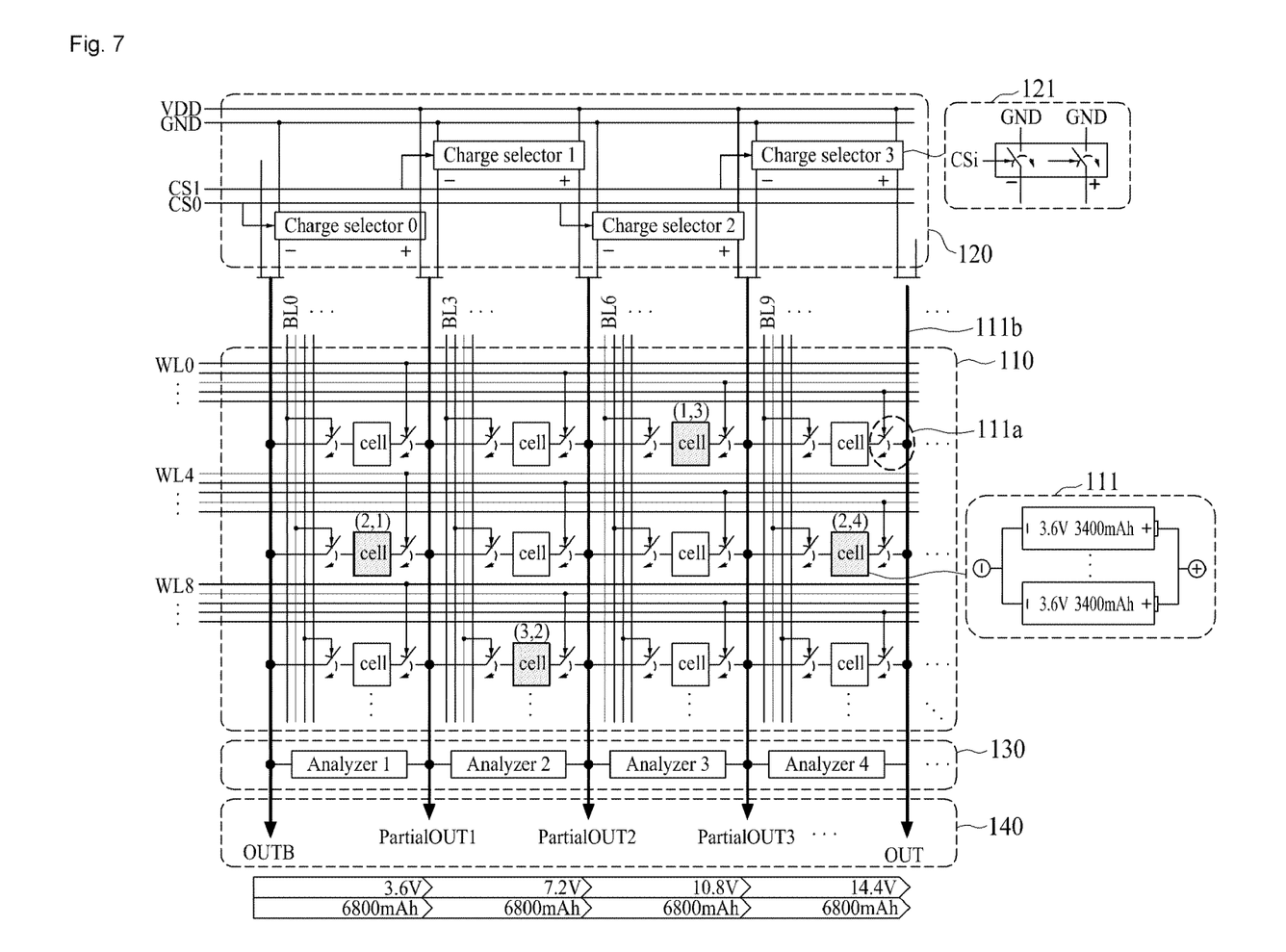
FIG. 7 is a drawing of a battery cell array according to an embodiment of the present invention.
Figure 8:
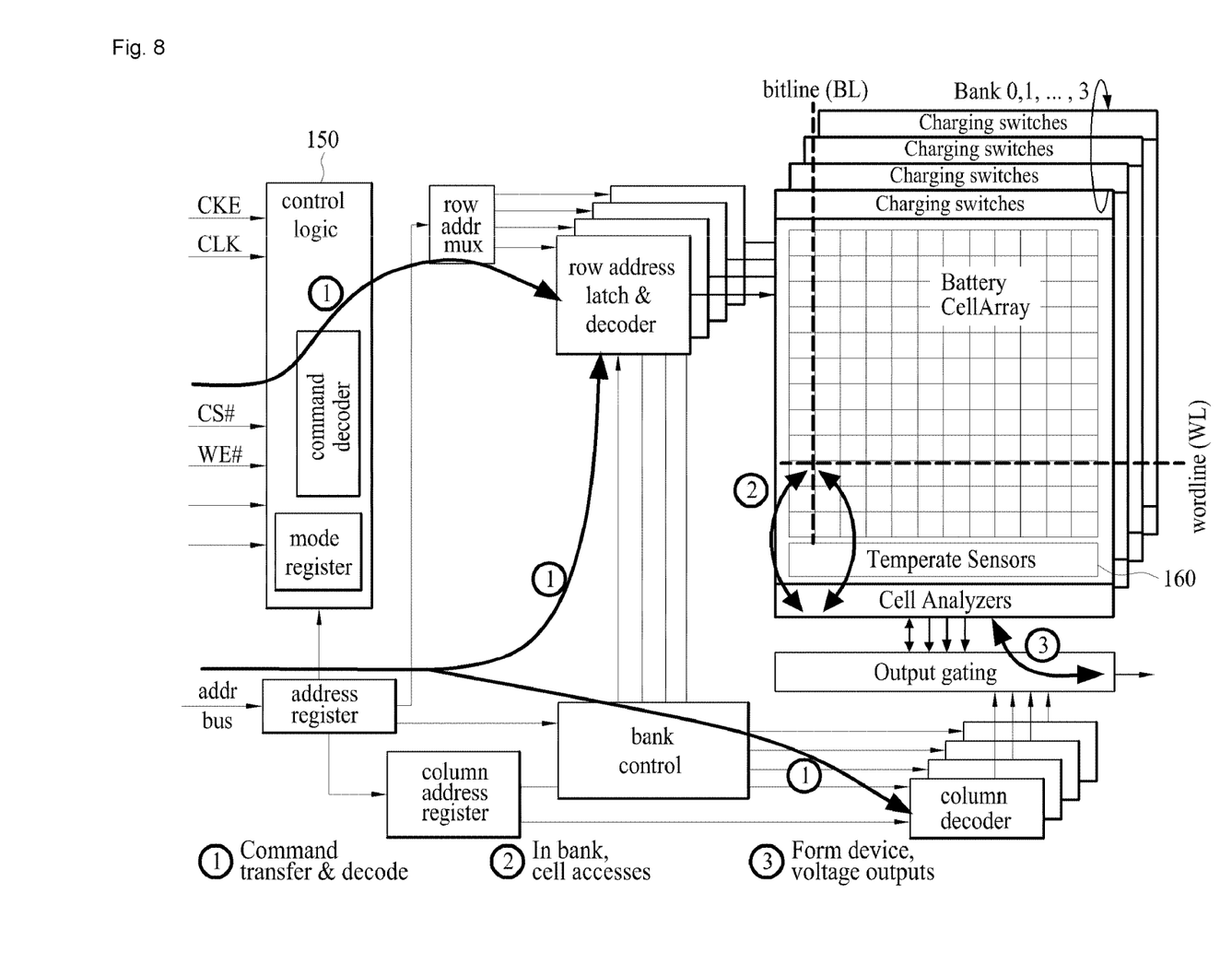
FIG. 8 is a conceptual drawing of a battery management system according to an embodiment of the present invention.

FIG. 7 is a drawing of a battery cell array and FIG. 8 shows a conceptual drawing of a battery management system according to an embodiment of the present invention.

Referring to FIG. 7 and FIG. 8, the present invention includes a battery cell array 110, a charger selector array 120, an analyzer array 130, a battery output array 140, a temperature sensor array 160 over the battery cell array, and a controller 150.

The charger selector array 120 enables the power input sources (VDD and GND) to alternatively and/or concurrently charge the battery cell array(s) to which multiple battery cells are attached. A charger selector 121 is an electrical or mechanical switch that depending on the charger selector 121 signals connects the power sources (VDD and GND) to the power lines(PLs) 111*b* so that the power input sources are delivered to the selected the battery array(s) through PLs. The charge selector(s) 121 turns off when the related battery cell(s) is in discharging mode.

A PL is placed and shared by two adjacent columns of the proposed battery cell array along the column direction. The column select signal CS controls which column(s) of the array is connected to PL. Plural CS signals can be implemented and activated in a time sharing fashion. In the figure, alternative assertion of CS0 and CS1 signals makes sure that each PL carries one electrical polarity and protects the battery system from being electrically shorted between the power input sources.

The battery cell array 110 is in a form of an m-by-n matrix, where m is the number of rows and n is the number of columns. If necessary, the battery cell matrix can be extended to be a higher-order matrix such as a three-dimensional matrix. For example, the battery cell array shown in FIG. 7 illustrates a single battery bank containing a 3-by-4 matrix or array of battery cells where row addresses are formed from one or plural wordlines (WLs) that are driven to activate one cell on each one of four bitlines (BLs). A cell(s) in the battery cell array or matrix can be selected by activating both WL and BL. Each cell has a pair of switches 111*a*, one switch 111*a* is controlled by WL and the other by BL, that make an electrical or mechanical connection or disconnection between the cell and the associated PL.

Note that the innate matrix or array form of battery cells can be extended to include more cell elements for larger size and capacity depending on target applications if so desired. A number of benefits appear when an electric battery is sized for long range. A larger-capacity battery results in a lower average depth of discharge and consequently longer cycle life and lower peak charge/discharge rate. If a battery pack is designed to have capacity providing long range, it is likely that daily charging will be at low depth of discharge. The impact of this on electric vehicle design, for example, is important. It means that the route to long range or high capacity may also result in lower depth of discharge and longer life for a given battery chemistry. If maximum charging is limited to, say, 80% of its maximum capacity during most operation, maximum voltage is avoided. If the battery pack is also thermally controlled, reaching both maximum voltage and/or high temperatures is avoided. In this way, controlled conditions can increase battery life substantially.

In the battery cell array, two adjacent columns of the cell array share one PL along the column direction. Plural (e.g., three in the figure) cells in each column can be connected to a PL at the column direction, but only one cell selected by both WL and BL asserted will get charged from or discharged to the associated PLs at a time during the charge phase or discharge phase, respectively.

Battery cell 111 is a package that contains one single or multiple re-chargeable battery units. For example, the battery cell shown in FIG. 4 consists of two 3.6V 3,400 mAh battery units connected in parallel. Battery cells in FIG. 7 selected by the forwarded row and column addresses inside the chosen bank (e.g., bank 0 in this example) are marked in gray: cell (2,1), (3,2), (1,3), and (2,4), and the forwarded row (WLs) and column (BLs) addresses are indicated in gray. Note that at least one battery cell is selected at each column and the selected cells are electrically or mechanically connected through the PLs placed intermediately in the array and their voltages are electrically accumulated along the row direction.

All or part of PLs run to the battery output array 140 where the input voltages carried from the PLs are reconstructed. A set of resultant output voltages driven by the battery cell arrays are partially and/or fully accumulated voltage levels with respect to a reference voltage level (i.e., OUTB) such as PartialOUT1, PartialOUT2, etc., and/or OUT, respectively.

The analyzer array 130 contains an analyzer or an array of analyzers and each analyzer monitors the condition or status of a cell selected with the asserted WL and BL in the column of interest. The analyzer may report the monitored information to the controller 150 that now traces the individual cell's condition or status that may include but not limited to features such as the degree of charge or discharge of each battery cell (how much each battery cell is charged or discharged), the number of charge-and-discharge times (how many times the cell has been charged and discharged), whether working properly or not, whether being able to be charged up to a certain voltage level within a certain time, and a maximum chargeable voltage (how much the cell can be charged), and a charging level (how much the cell is charged) for each battery cell, and etc. in runtime. Further, a temperature sensor(s) 160 placed on a battery cell(s) and/or the battery array may report the temperature information of the corresponding individual battery cell(s) or the entire battery array to the controller 150 in runtime as well.

Based on information reported from the analyzers 130 and temperature sensors 160, the controller 150 may select which cell(s) to be charged or discharged for the next cell accesses. Well-known algorithms such as RR (Round Robin) and/or LRU (Least Recently Used) and/or LFU (Least Frequently Used) can be used to select a cell(s) from the charged or discharged pool or group for discharging (power-providing to the outside applications) or charging accesses in normal, respectively.

FIG. 8 also illustrates the multiple overlapped phases of operation such as command transport and decode, cell accesses in a bank, and outputs from the device.

Battery management system can have multiple battery banks as shown in FIG. 8, where each bank has its own battery cell arrays 110, row and/or column address decoders, charger selector array 120, and analyzers array 130 and battery output array 140. A single bank consists of plural arrays of battery cells where a row address(es) is formed from one or plural wordlines (WLs) driven concurrently to activate one or multiple cell(s) on each one of thousands of bitlines (BLs). The battery outputs may be combined with their counterparts in other banks so that the combined battery outputs work as final battery outputs of the entire battery system.

The battery system (or device) may contain an address register(s) that is used to store a cell location(s) and control the command and/or data flow within the system. The address may consist of separate row and column addresses rather than a single address. In the case of separate addresses, the address register may accordingly consist of separate row and column address registers to control battery operation. Wordlines (WLs) and bitlines (BLs) can be driven concurrently or alternatively through a register(s) that holds the WL and/or BL addresses for a certain period of time. WL(s) and BL(s) are driven directly or indirectly, and concurrently or sequentially from the row and column decoders, or row addresses and column addresses are buffered into their corresponding registers that now drive the target WL(s) and BL(s). In the later case, the related row and/or column address registers are programmed sequentially or in parallel which may help to lower the hardware complexity and increase design efficiency by trading off the required hardware resources such as internal bus width.

For a battery cell access command, an address(es) from the address register(s) is forwarded to the row address latch and decoder, and the address(es) is used to activate the selected address line(s) like WL or BL. Electric charge from the battery cell(s) selected by the activated WL(s) and BL(s) is then discharged onto the corresponding power lines(PLs) 111b. The PLs are fed into the input and output (I/O) gating circuit that produces partially and/or fully accumulated voltages out of the voltages associated with the PLs. The partial and/or full voltages are now finally delivered to the outside world from the battery device.

Besides the row and column address decoders, at least one more address decoder, if required, activates a select signal(s) to select a further address line(s) when the order of a battery matrix of battery cells is more than two-dimensional.

The controller 150 controls a bank select signal(s) to select a battery bank(s) of the plurality of battery banks.

Referring to FIG. 8, there can be multiple overlapped phases of operation for an abstract battery cell access command as follows: in phase one (Command transfer and decode), a command is transferred through the command and address buses and decoded by the device; in phase two (Cell access in Bank), electric charge is moved within a bank, either from a cell(s) to PL(s) or from PL(s) into the battery array(s); in phase three (Outputs from Device), the resultant voltage output(s) partially and/or fully accumulated out of individually placed voltage(s) on a PL(s) driven from the battery core array is fed onto the output terminals of the device to be delivered to the outside world through the I/O gating. The output terminals may be connected to multiple banks of battery.

Other Advantages of the Present Invention

This present invention can dynamically reconfigure array connections of battery cells and thus help to efficiently manage the C rate of a battery by keeping the C-rate high during charge phase and low during discharge phase. The C rate is defined in units of C, where 1C means the battery can be charged in one hour. If the battery is charged at 2C, the battery may be charged in half an hour. Battery cells in this invention are innately arranged in an array and dynamically configurable. Depending on a network configuration of active cells, fewer cells connected in parallel resulting in higher C-rate enables the battery device to get charged faster in the charging mode whereas more cells connected in parallel allow the same device to discharge higher current and produce larger energy while individual cell with lower C-rate can stay within its C limit and last longer.

2. Active Pool, Discharged Pool, Charged Pool and Other Pools

There may be various pools (or groups or queues or bitmaps) of regular battery cell(s) managed in battery: active, discharged, and charged pools. Active pool contains an active battery cell(s) that is charged and electrically hooked up in the battery array(s) and can immediately provide electric power to the outside or applications; Discharged pool contains a cell(s) that is deeply or shallowly discharged and needs to be recharged to be active. Charged pool has a charged cell(s) that is ready to be active. When a battery cell is or gets faulty, the cell becomes an obsolete one excluded from the active, charged, and discharged pools mentioned above and/or maybe belonged to another pool like an obsolete pool further, if necessary.

Once the controller 150 chooses a cell(s) in the charged pool to activate, the controller 150 configures to make the cell(s) active and accordingly updates its internal information maintained, for example, in an internal history table form. After a cell(s) from the discharged pool gets sufficiently charged to a certain voltage level within a time, the controller 150 moves the newly charged cell to the charged pool from the discharged pool and then updates its internal information accordingly to point to the new active cell location. A discharged cell being too discharged to be active and its voltage level lowered down to a certain level is erased from the active cell pool, and assigned to the discharged pool and made available as a candidate cell to be charged later.

Each battery cell can have its own history table. A history table of some sort can be kept for each cell in order to keep trace of its behaviors including but not limited to the number of charge (and discharge) cycles (how many times it has been charged and discharged) that it has undergone, and/or charging time (how long it takes to get charged up to a defined capacity (e.g., voltage or charge) level), and/or status (which pool it belongs to among active, charged, discharged, obsolete pools, etc.), and/or validity (whether it is a valid and regular, or faulty and obsolete cell), etc.

A battery cell(s) on the media can be tracked and/or selected in a RR (Round Robin) and/or LRU (Least Recently Used) and/or LFU (Least Frequently Used) queue or pool of some sort. Data structures for the corresponding queues themselves can be stored either off-device or on-device.

On battery devices, the techniques proposed in the present invention may be implemented in hardware by a built-in microcontroller. On such devices, the techniques proposed in the present invention including wear leveling are transparent, and most conventional battery systems can be used on them as-is. The techniques proposed in the present invention can also be implemented in software on the media, which may be a log-structured system in that the media may be treated as circular logs and selected to access the battery cells in sequential passes.

3. Wear Leveling

Wear leveling (also written as wear levelling) is a technique to prolong the service life or lifespan of a battery device. Wear leveling ensures even wear-out of all battery unit cells by equally distributing all charge cycles across the media, thus resulting in increased endurance. In this way, no single cell prematurely fails due to a high concentration of charge/discharge processes. Without wear leveling, applications would constantly charge and recharge only some part of the battery cells which would quickly wear them out. Frequently used locations as a result will wear out quickly, while other locations will not be used at all. Once a few cells reach their end of life, such batteries become inoperable.

In wear leveling, all new electric charge is written to a cell(s) that belongs to the discharged pool not maintaining a certain voltage level. A controller 150 selects a cell(s) from the discharge pool based on reported information such as the number of charge cycles that the cell(s) has already undergone. Wear leveling addresses the issue of repeated charge/discharge cycles to the same battery cell(s) by redirecting new charge/discharge processes to a different cell(s), thus avoiding a premature wear-out of a too heavily used battery cell(s).

Wear leveling treats battery as a system, rather than individual battery cells of media. The act of analyzing in runtime how each cell is behaving (charging time and charging capability, etc) allows the controller 150 in a battery system to see whether the cell gets too aged or faulty. Further, being able to dynamically monitor how many times each individual cell gets charged-and-discharged allows the controller 150 in the system to choose which cells should get more often charged than others. This enables the system to tune batteries to meet specific endurance levels required for a variety of applications. Obviously, the higher the endurance the longer battery will be able to operate.

In wear leveling, the entire image is leveled. Unless otherwise specified, all available and valid cells across the battery device participate in the wear-leveling operation. This rotational effect ensures all valid cells to receive the same amount of wear and the device to continue to operate until most of the cells are near their end of life. Static wear leveling would be most often used in general applications.

4. Over-Provisioning or Redundancy

The over-provisioning technique sets aside extra (or redundant or dummy) physical battery cells for the use in case, resulting in higher endurance and better performance. Extra battery cells can be programmed to be connected to the main battery array if required. Similar to other battery cells, over-provisioned or reserved battery cells may be managed through a pool or group and/or bitmap, dedicatedly or combined with ones for regular cells.

When a certain cell(s) in the main array becomes faulty (e.g., not chargeable enough up to a certain pre-defined capacity level within a certain time), a controller 150 in the battery management system excludes that obsolete cell in selection as a normal cell for valid battery operation and replace the obsolete cell with a candidate cell selected from a pool of redundant cells by reconfiguring the matrix of battery cells, and/or the charger selector array and/or the battery output array accordingly. In this case, the controller 150 logically remaps the obsolete cell with the selected redundant cell and/or physically reconfigures the network connection of the main battery and/or extra cell(s) so that the selected redundant battery cell can substantially substitute for the obsolete cell. A redundant or extra cell(s) is a spare cell(s) that is prepared for replacement of a battery cell that becomes too aged or damaged to work as a normal cell. Note that each battery cell has a limited endurance (the maximum number of being charged-and-discharged times) and capacity from when it is manufactured, and naturally becomes aged and faulty, and degrades in voltage and charge-holding capability while charging-and-discharging processes are repeatedly performed. Differences further can exist among all battery cells and each battery cell can have its own maximum endurance, and electrical, thermo dynamical and mechanical characteristics ready set when manufactured. In other words, each cell can have different endurance and lifespan due to PVT (process, voltage and temperature) variations. Manufacturers usually provide each product with a minimum lifetime of product specifications. Since we don't know which cell(s) becomes obsolete while maintaining an overall target quality of the battery system in voltage and charging capacity, provision of a redundant cell(s) to replace an aged, obsolete or faulty cell(s) in runtime if necessary helps to keep consistent overall quality, and extend the lifetime and reliability of the entire battery system.

Over-provisioning is the employment of more battery cell(s) than presented at an advertised user capacity. This extra cell(s) included in the wear-leveling operation does not add to the battery charge capacity disclosed to the user. The more over-provisioned space a battery system has, the longer it will last. As a rule of thumb, every time the battery device's over-provisioning is doubled the device's endurance is added by 1×. Over-provisioning may simply come with cost. The end user is paying for electrical chargeable space they cannot access in exchange for a longer battery life.

5. Boosting/Lessening/Throttling Modes

BOOSTING, LESSENING, and THROTTLING techniques are a kind of reconfiguration of the battery cell array network or connection. BOOSTING raises up battery performance for urgent situations or sort of that require instantaneous output power/voltage increase from a battery system. In the BOOSTING battery mode, available regular and/or spare cells are additionally connected electrically to a given battery cell network in serials and/or parallel, which enables quick increase in voltage or power at the battery outputs. LESSENING is opposite to BOOSTING. LESSENING mode reconfigures the battery cell array network to push down battery performance for a non-busy moment that require less output power or voltage from the battery.

The controller 150 is configured to allow the battery cell array 110 to be reconfigured, and/or the charger selector array 120 and/or the battery output array 140 to enable a spare or redundant battery cell(s) to be electrically and/or mechanically connected to a given battery cell network in serials and/or parallel, wherein a battery cell(s) from the active pool is already connected in serials and/or parallel, to achieve quick increase in voltage or power at the battery outputs in BOOST battery mode.

The controller 150 is configured to allow the battery cell array 110 to be reconfigured, and/or the charger selector 120 array and/or the battery output array 140 to work with fewer active cells by electrically and/or mechanically disconnecting an active cell(s) from a given battery cell network, wherein battery cells from the active pool are already connected in serials and/or parallel, to achieve quick decrease in voltage or power at the battery outputs in LESSENING battery mode.

The controller 150 is configured to allow the battery cell array 110 to be reconfigured, and/or the charger selector array 120 and/or the battery output array 140 to work with fewer active cells or a different battery cell(s) available from other pools such as the charged pool or redundant pool by electrically and/or mechanically disconnecting an overheated and active cell(s) and/or replacing an overheated and active cell(s) with a less-heated candidate cell(s) from other pools in a given battery cell network to achieve quick decrease in temperature based on the temperature information reported from a temperature sensor(s) 160 placed on a battery cell(s) and/or the battery system in thermal THROTTLING battery mode.

Normally, neither excessive nor insufficient battery cells are activated and a battery system provides a regular voltage and power to the final output terminals. Availability of BOOSTING and or LESSENING modes may further provide a way to use a battery device in an eco-friendly way. For example in EV applications, BOOSTING driving mode can provide an extra power for electrical vehicles to instantaneously speed up or drive a heavy load. LESSENING operation mode prevents the same battery device from over-generating power and thus saves electric energy. LESSENING mode dynamically reconfigures the battery cell network array to work in the much less-power mode or more power-saving mode with fewer cells connected in series and/or parallel, for example, while underlying applications remain stationary and stay in idle times.

THROTTLINGING mode prevents a battery device from being overheated and thus saves the device. Excessive temperature may shorten battery's life or even permanently damage the battery itself. When a temperature sensor(s) 160 gives temperature readings of around a certain threshold (say, 130° C.), the battery device starts throttling. A mechanical and/or electrical temperature sensor(s) 160 may measure the body and/or ambient temperature of an individual cell(s) and/or the entire battery device. Temperature information read from the sensor(s) may be reported to the controller 150 and used for over-heated cell replacement(s) during the next cell accesses. This thermal THROTTLING mode may cause the overall battery performance like output voltage and power performance to be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery management system including:
   a battery cell array including plurality of battery cells;
   a charger selector array connected electrically to the battery cell array to charge the battery cells;
   an analyzer array configured to monitor a condition or status of the battery cells and report a condition or status of each battery cell;
   a battery output array connected electrically to the battery cell array to provide electric power out of the battery cells; and
   a controller configured to rearrange the battery cell array, to control an operation of at least one of the charger selector array and the battery output array according to the reported condition or status from the analyzer array and to activate at least one of select signals to select at least one of battery cells in the battery cell array,
   wherein the condition or status includes the number of times of being charged and discharged of the each battery cell, information indicating if the each battery cell is working properly, and information indicating if the each battery cell is able to be charged up to a predetermined capacity level within a predetermined time and a maximum chargeable capacity level for the each battery cell.

2. The battery management system of claim 1, the condition or status further includes the amount or degree of being charged and discharged and a charged capacity level for each battery cell.

3. The battery management system of claim 1, the condition or status further includes information whether a certain battery cell has a fault so that the battery cell is not rechargeable enough up to a predefined capacity level within a predetermined time or not.

4. The battery management system of claim 1, wherein the controller is configured to tune the battery cell array to meet a specific endurance levels required for a variety of applications by reconfiguring the battery cell array, and/or the charger selector array and/or the battery output array accordingly.

5. The battery management system of claim 1, wherein the controller is configured to newly redirect the charging and discharging processes to at least one of different battery cells to avoid a premature wear-out of at least one of heavily used battery cells.

6. The battery management system of claim 3, wherein the controller is configured to exclude at least one of obsolete cells in selection as a normal cell for valid battery operation and to replace the obsolete cell with at least one of candidate cells selected from a pool of redundant cells by reconfiguring the battery cell array, and/or the charger selector array and/or the battery output array.

7. The battery management system of claim 1, wherein the controller is configured to reconfigure the battery cell array, and/or the charger selector array and/or the battery output array to enable at least one of spare or redundant battery cells to be electrically and/or mechanically connected to a given battery cell network in serials and/or parallel, wherein at least one of battery cells from the active pool is already connected in serials and/or parallel, to achieve quick increase in voltage or power at the battery outputs in BOOST battery mode.

8. The battery management system of claim 1, wherein the controller is configured to reconfigure the battery cell array, and/or the charger selector array and/or the battery output array to work with fewer active cells by electrically and/or mechanically disconnecting at least of active cells from a given battery cell network, wherein at least one of battery cells from the active pool are already connected in serials and/or parallel, to achieve quick decrease in voltage or power at the battery outputs in LESSENING battery mode.

9. The battery management system of claim 1, wherein the controller is configured to reconfigure the battery cell array, and/or the charger selector array and/or the battery output array to work with at least one of fewer active cells and/or at least one of different battery cells available from the charged pool or redundant pool by electrically and/or mechanically disconnecting at least one of overheated active cells and/or replacing an overheated at least one of active cells with at least one of less-heated candidate cells from the other pools in a given battery cell network to achieve quick decrease in temperature based on the temperature information reported from at least one of temperature sensors placed on at least one of the battery system and at least one of the battery cells in thermal THROTTLING battery mode.

10. The battery management system of claim 1, wherein each of the battery cells is traced and selected in a queue or pool, and a data structure for the queue or pool can be stored in either off-device or on-device.

11. The battery management system of claim 1, wherein each of the battery cells is classified into one of an active pool, a discharged pool and a charged pool, wherein the active pool consists of battery cells electrically charged and selected to provide electric power to at least one of the battery output terminals, wherein the discharged pool consists of at least one of the battery cells deeply or shallowly discharged and requiring to be recharged to be active, wherein the charged pool consists of at least one of the battery cells charged enough and ready to be active, when a battery cell is or gets faulty, the battery cell becomes an obsolete one excluded from the active pool, the charged pool and the discharged pool and is assigned to other pools including an obsolete pool which consist of defected or obsolete battery cells.

* * * * *